United States Patent [19]

Siems

[11] 4,117,448
[45] Sep. 26, 1978

[54] SEISMIC TELEMETRIC SYSTEM FOR LAND OPERATIONS

[75] Inventor: Lee E. Siems, Houston, Tex.

[73] Assignee: Western Geophysical Company of America, Houston, Tex.

[21] Appl. No.: 787,176

[22] Filed: Apr. 13, 1977

[51] Int. Cl.² .............................................. G01V 1/22
[52] U.S. Cl. ......................... 340/15.5 TS; 179/15 AL; 179/15 BL; 340/152 T
[58] Field of Search ..................... 340/15.5 TS, 152 T; 179/15 AL, 15 BL

[56] References Cited

U.S. PATENT DOCUMENTS

| | | | |
|---|---|---|---|
| 3,538,498 | 11/1970 | Games et al. | 340/146.1 BE |
| 3,805,235 | 4/1974 | Foster et al. | 340/146.1 BE |
| 3,905,010 | 9/1975 | Fitzpatrick | 340/18 NC |
| 3,986,162 | 10/1976 | Cholez et al. | 340/15.5 TS |
| 3,996,553 | 12/1976 | Siems et al. | 340/15.5 TS |
| 4,001,769 | 1/1977 | Fort et al. | 340/15.5 TS |

Primary Examiner—Howard A. Birmiel
Attorney, Agent, or Firm—William A. Knox

[57] ABSTRACT

The telemetric system consists of a large number of identical cable sections laid over the ground end-to-end, in a long array or "spread". The cables have a number of external connectors along their length for connecting geophone groups. The cables are electrically and physically interconnected by a like number of data transceiver modules. The data transceiver modules contain circuitry to receive and process data from the various geophone groups. A recording and control unit is connected to the spread at some convenient accessible location. The recording and control unit transmits control signals to the respective data transceiver modules. In response to the control signals, the respective modules transmit digital seismic signals, back to the recording and control unit. The cable sections and data transceiver modules are not polarized; that is, it is immaterial which end of a cable section is plugged into which side of a transceiver module. The same telemetric link that is used to transmit command and interrogation pulses to the respective transceiver modules is also used to receive digital data words from the respective modules. Accordingly, a direction sense circuit in each module determines the direction of any given module with respect to the recording unit and orders the digital logic contained within the module to electrically "face" the recording unit.

16 Claims, 8 Drawing Figures

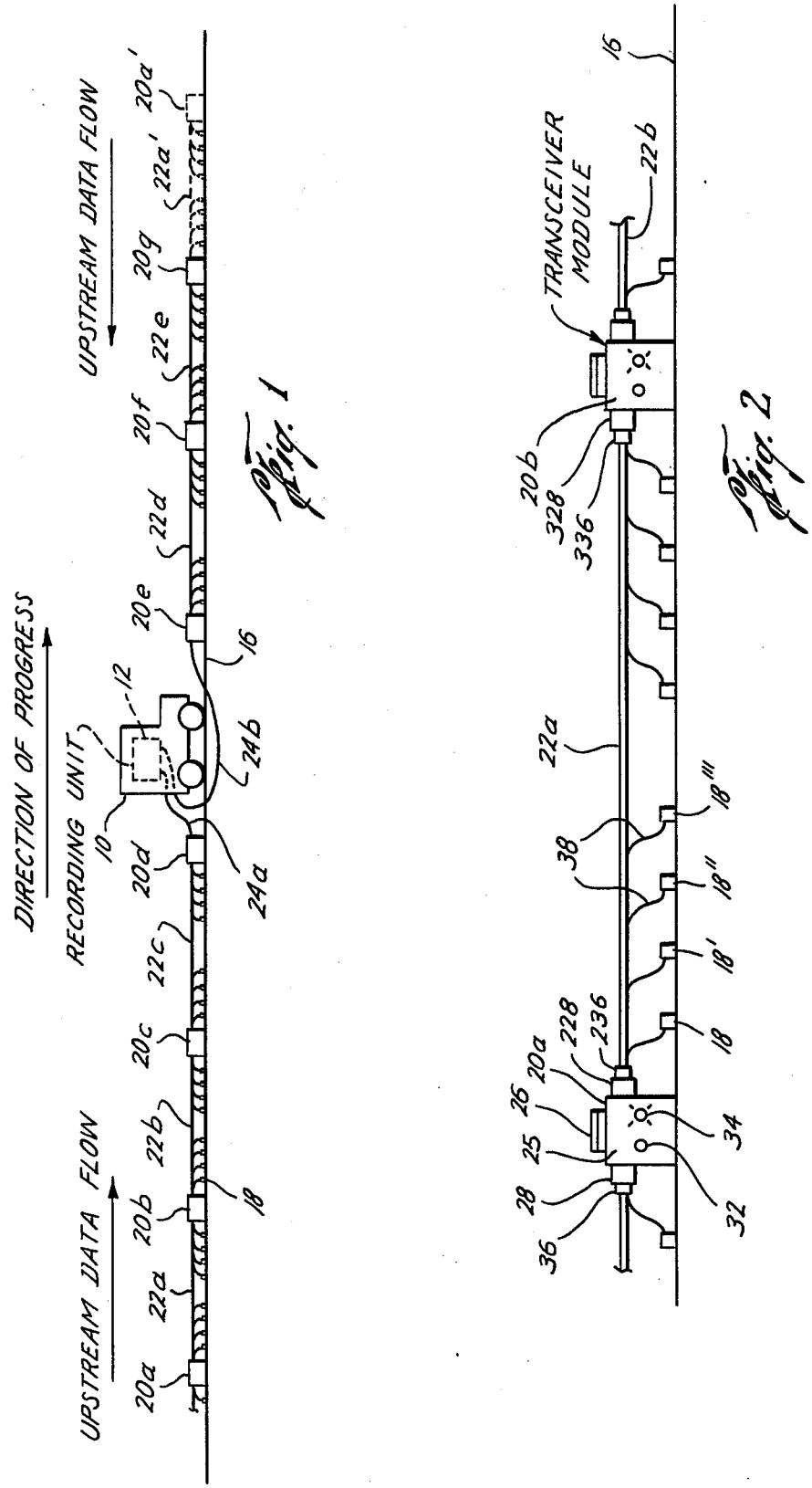

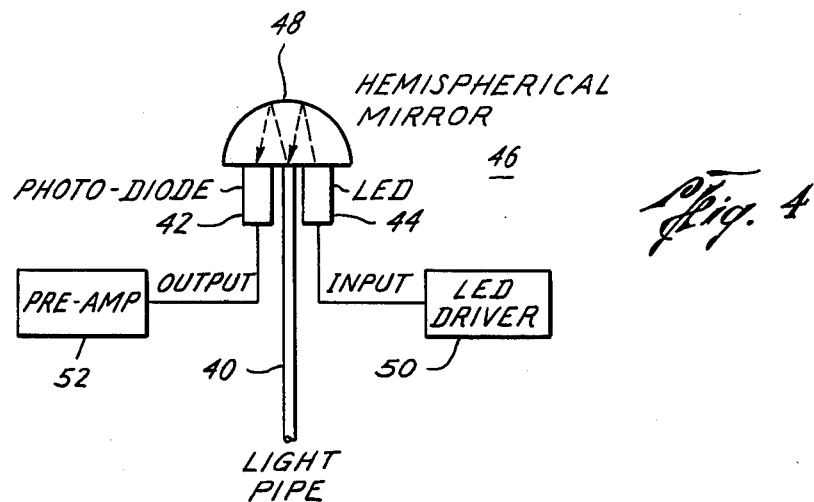
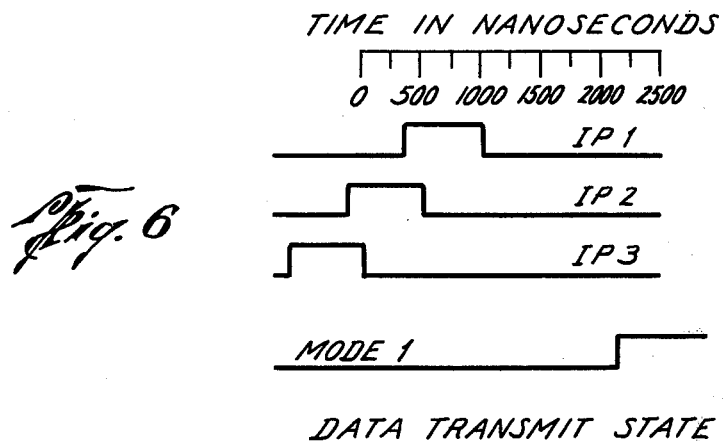
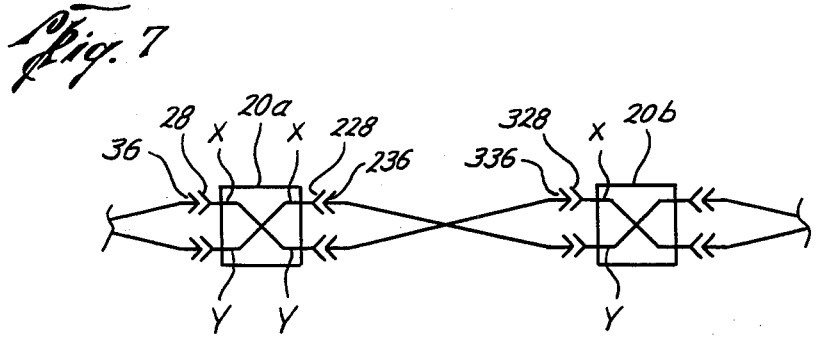

SEISMIC TELEMETRIC SYSTEM FOR LAND OPERATIONS

RELATION TO OTHER PATENTS AND APPLICATIONS

This application is a part of a series of patents and pending applications as listed below and assigned to the assignee of this invention:

U.S. Pat. No. 3,990,036 for Multiplexing and Apparatus for Telemetry of Seismic Data.

U.S. Pat. No. 3,996,553 for Seismic Data Telemetering System.

U.S. Pat. No. 4,005,273 for Multiplexer Offset Removal Circuit.

Application Ser. No. 664,614 for Multiplexer commutated High Pass Filter, now U.S. Pat. No. 4,031,506.

Application Ser. No. 664,616 for Gain Ranging Amplifier System, now U.S. Pat. No. 4,032,504.

Application Ser. No. 664,617 for Multichannel Seismic Telemetery System and Array Former, now U.S. Pat. No. 4,072,923.

Application Ser. No. 664,618 for Decentralized Seismic Data Acquisition System, now U.S. Pat. No. 4,092,629.

Application Ser. No. 665,150 for Seismic Method and System of Improved Resolution and Discrimination, now abandoned.

Application Ser. No. 665,151, for Seismic Data Telemetering System, now U.S. Pat. No. 4,023,140.

BACKGROUND OF THE INVENTION

1. Field of the Invention

This invention relates to a telemetric system for transmitting seismic data from remote sensors to a central recording unit.

2. Description of the Prior Art

Recent developments in seismic exploration demand the use of several hundred to a thousand seismic sensor groups, each composed of one or more individual sensors. Usually a group will contain three to 30 sensors electrically interconnected to form a single data channel. Formerly it was necessary to provide a multiconductor seismic cable containing many hundred conductor pairs, one pair for each sensor group, to transmit the seismic-data analog signals from the sensor groups to a central multichannel data processing and recording unit. Because of the sheer bulk and weight of such a cable, geophysicists have devised various telemetric systems. Usually a typical system include one or more channels for transmission of interrogation and command signals and a channel for data transmission.

A typical telemetric system is disclosed in U.S. patent application Ser. No. 664,618, now U.S. Pat. No. 4,092,629, for a Decentralized Seismic Data Acquisition System, assigned to the assignee of this invention. Briefly, the above-cited system is designed primarily for marine seismic exploration. It consists of a plurality of cable sections, such as 50, each section being about 200 feet long. The cable sections are mechanically and electrically coupled together end-to-end by connector modules to form a cable assembly.

The cable assembly is coupled to a central station mounted in a ship. The ship tows the cable assembly through the water along an assigned line of survey. The central station includes recording circuitry and apparatus to transmit control and interrogation signals through a telemetric interrogation link and to receive, process and record digital words from the telemetric data link.

Embedded in each cable section are 10 to 12 elemental seismic sensor groups each of which is composed of several interconnected seismic sensors such as hydrophones. The electrical output of each sensor group constitutes a single data input channel. Contained within each connector module, is a 12-channel transceiver unit. The seismic sensor groups in a given cable section are connected to the respective inputs of the transceiver unit associated with that section.

The transceiver unit includes a multiplexer coupled to the interrogation link, for receiving the analog signal from the respective sensor groups. In response to interrogation signals transmitted from the central recording station, the multiplexer is reset and then advances to first input channel to acquire a first analog input signal sample from a seismic sensor group. The signal sample is filtered, gain conditioned, digitized as a digital data word, and clocked out over the data link to the central recording station. As the interrogation signal arrives successively at the various transceiver units, a corresponding digital data word is transmitted back to the recording station.

A second interrogation pulse sequences the multiplexers in the fifty data transceivers to a second input channel for sampling and digitizing to provide a second digital data word from the respective second channels. Over a period of one scan cycle, which is approximately 1 millisecond (thousandth of a second), all of the input channels from all of the data transceivers are sampled.

During each scan cycle, approximately 500 to 60 multibit data words are sent to the central recording station by employing a two-level time-sequential/channel-sequential multiplexer scheme. The digital data words transmitted from the respective transceiver associated with each cable section are ordered in accordance with the propagation delay time for a signal travelling through the interrogation link between the central-station recorder and the transceivers. Digital data words from corresponding channels within the transceiver units are ordered in accordance with the channel-select sequence during a scan cycle.

The physical cable assembly just described is specifically designed for use in the water. Once the cable sections have been joined together, they are not readily disconnected. Accordingly, the entire cable assembly nearly two miles long, is stored on a large reel on the stern of a ship. In use, the cable is deployed in the water and towed behind the seismic recording ship. Specially built for marine use, each section weighs about 50 pounds in air but is neutrally bouyant in the water. The central recording unit, mounted in the ship is always connected to the leading end of the cable assembly. The cable sections are polarized; that is, the cable sections are always mated together in only one way with respect to each other. There is a leading end and a trailing end to each cable section and connector module.

One object of the present invention is to design cable having operating principles similar to the marine cable for use on land. The electrical aspectss of data processing and data telemetry between sensors and the recording unit apply equally to land or marine use. But the physical construction of the cable sections and certain electronic circuits in the connector modules must be modified for use on land.

In land operations, the cable sections are laid along the ground, end-to-end. Each end of a section is term ated by a male plug. Transceiver modules having two female plugs, mateable with the male cable plugs, electrically interconnect adjacent cable sections. The entire array of interconnected cable sections is termed a 'spread". As the exploration effort progresses along an assigned line of survey the spread must be advanced along the ground. After recording operations are completed at a given station, the spread is advanced by disconnecting one or more sections and transceiver modules from the back end of the spread and reconnecting those sections and modules to the front end of the spread in the direction of advance. Thus, the cable sections and transceivers modules must be readily disconnectable.

In many areas, particularly in harsh terrain, the sections are moved by hand by unskilled laborers. Accordingly, the cable sections and transceiver modules must be light enough to be hand-carried. Because of the use of unskilled laborers who cannot distinguish one end of a cable from the other, the cables should advantageously be unpolarized. That is, the cable sections and transceiver modules can face in either direction relative to one another and to the recording equipment, which is usually mounted in a wheeled vehicle although the recording equipment also, may be man-portable. It is commonplace to lay out a very large number of cable sections ahead of time and only utilize a fraction of these sections as the actual speed to be associated with a particular survey station during a particular recording cycle. The recording unit is plugged into the spread at any convenient location. There is no a priori knowledge as to which end of the spread is the leading or trailing end with respect to the recording unit and the direction of advance.

In the marine system, separate telemetric links were used to send command, interrogation and data signals. In the interest of weight saving, only one telemetric link is used in the land system for all three signals. Accordingly, since the cable sections and transceiver modules are unpolarized with respect to the physical location of the recording unit, a given transceiver module must be told which way to "face" to enable it to receive interrogation and command signals from the recording unit and to transmit data signals back to the recording unit.

Representative land telemetric systems are described in U.S. Pat. No. 3,652,979 for "Installation for the Transmission of Multiplexed Seismic Signals"; U.S. Pat. No. 3,873,961, for "Method and Apparatus for Synchronizing Modular Seismic System"; U.S. Pat. No. 3,911,226, for "Installation for Multiplex Transmission of Digital Signals"; U.S. Pat. No. 3,881,166, for "Data Array Network Systems".

SUMMARY OF THE INVENTION

It is an object of this invention to provide a direction-sensing circuit for a seismic telemetric system having a single, bi-directional telemetric link for transmission of control signals and data between a number of seismic data transceivers and a central recording unit. The sense circuit defines the "up-link" direction of the recording unit relative to the data transceivers.

In accordance with an aspect of this invention, a number of cable sections are laid end-to-end along a line of survey, to form a spread. The cable sections are detachably interconnected electrically by a like number of data transceivers. The cable sections include bi-directional telemetric link and a pair of conductors to supply DC power to the data transceivers. The data transceivers contain signal multiplexing and digitizing logic to accept analog seismic signals from several geophones that are connected externally to the cable sections. The seismic signals from the several geophones associated with a given cable section and transceiver are sampled in sequence, digitized as digital data words, and transmitted up-link by the transceiver, over the telemetric link to the recording unit. The recording unit may be connected to the cable spread at any randomly convenient location such as in the middle. Accordingly, some of the cable sections will be behind the recording unit relative to the direction of advance of the survey, and the other cable sections will be in front of the recording unit. The term "up-link" is defined as the direction of the recording unit with respect to a data transceiver. Hence for the rear cable sections, up-link data flow is towards the direction of progress of the survey and for the front sections, up-link data flow is in the reverse direction. Adjacent cable sections are connected to a data transceiver by mating multiconductor connector plugs. Two of the pins of the connector plugs, designated X and Y, carry DC power for the electronics contained within the transceivers. If pin X is made positive, data flow is from back to front with respect to the relative positions of the transceivers and the recording unit. If pin X is made negative, data flow is from front to back.

In accordance with another aspect of this invention, the DC poser leads are transposed within each cable section, with respect to the X and Y pins. The DC power leads are also transposed inside the data transceivers with respect to the X and Y pins of the two connecting plugs mounted on each side of the transceiver module. Transposition of the power leads makes it possible to plug either end of a cable section into either side of a data transceiver.

In accordance with yet another aspect of this invention the telemetric link is a set of three triple-redundant light pipes embedded in the cable section. The light pipes are terminated at each end of a cable section by an LED (light emitting diode) for transmitting control and data signals and a photo detector for receiving control and data signals. The LED and photo detector are built into the connecting plug that terminates each end of a cable section. The LED receives electrical data pulses from the transceiver connected to the cable by the connector plug, and converts the signals to light pulses. The photo detector receives light pulse trains and converts them to corresponding electrical pulses which are received by the electronics in the transceiver through the pins of the mating connector plugs.

In accordance with a feature of this invention, a mode control pulse is sent from the recording unit to the transceivers. Mode 1 is a command or setup mode. In mode 1, selected transceivers are enabled or disabled to provide a so-called "roll-along" capability (see pending application Ser. No. 665,151 now U.S. Pat. No. 4,023,140) or to bypass a defective module. Mode 0 is a data transmit mode. In mode 0, the data transceivers that have been enabled, accept signals from the geophones, process the signals as digital words and transmit the digital words to the recording unit, all in response to control pulses received at the transceivers from the recording unit.

In accordance with a further aspect of this invention, a set of command pulses may be transmitted by the recording unit to the data transceivers through the three redundant light pipes. The leading edges of the command pulses are aligned with one another in time. Interrogation pulses are transmitted through the three redundant light pipes. A majority vote circuit accepts signals on any two out of three light pipes as a valid signal.

In order to distinguish a set of interrogation pulses from a set of command pulses, the leading edges of the three interrogation pulses are skewed in time with respect to each other. The set of interrogation pulses is de-skewed when received by a transceiver but is re-skewed when relayed down the spread to the next transceiver in line.

BRIEF DESCRIPTION OF THE DRAWINGS

These and other features and advantages of this invention will be more easily understood by reference to the appended detailed description and to the drawings wherein:

FIG. 1 is an overall view of the telemetric system;

FIG. 2 is an expanded view of a cable section and associated data transceiver modules;

FIG. 4 is an illustration of a star coupler;

FIG. 6 is a timing diagram for the interrogation pulses in the data transmit state.

FIG. 7 shows the method of transposing the power leads in and between the transceiver modules.

DETAILED DESCRIPTION OF THE PREFERRED EMBODIMENT

Figure 3A:
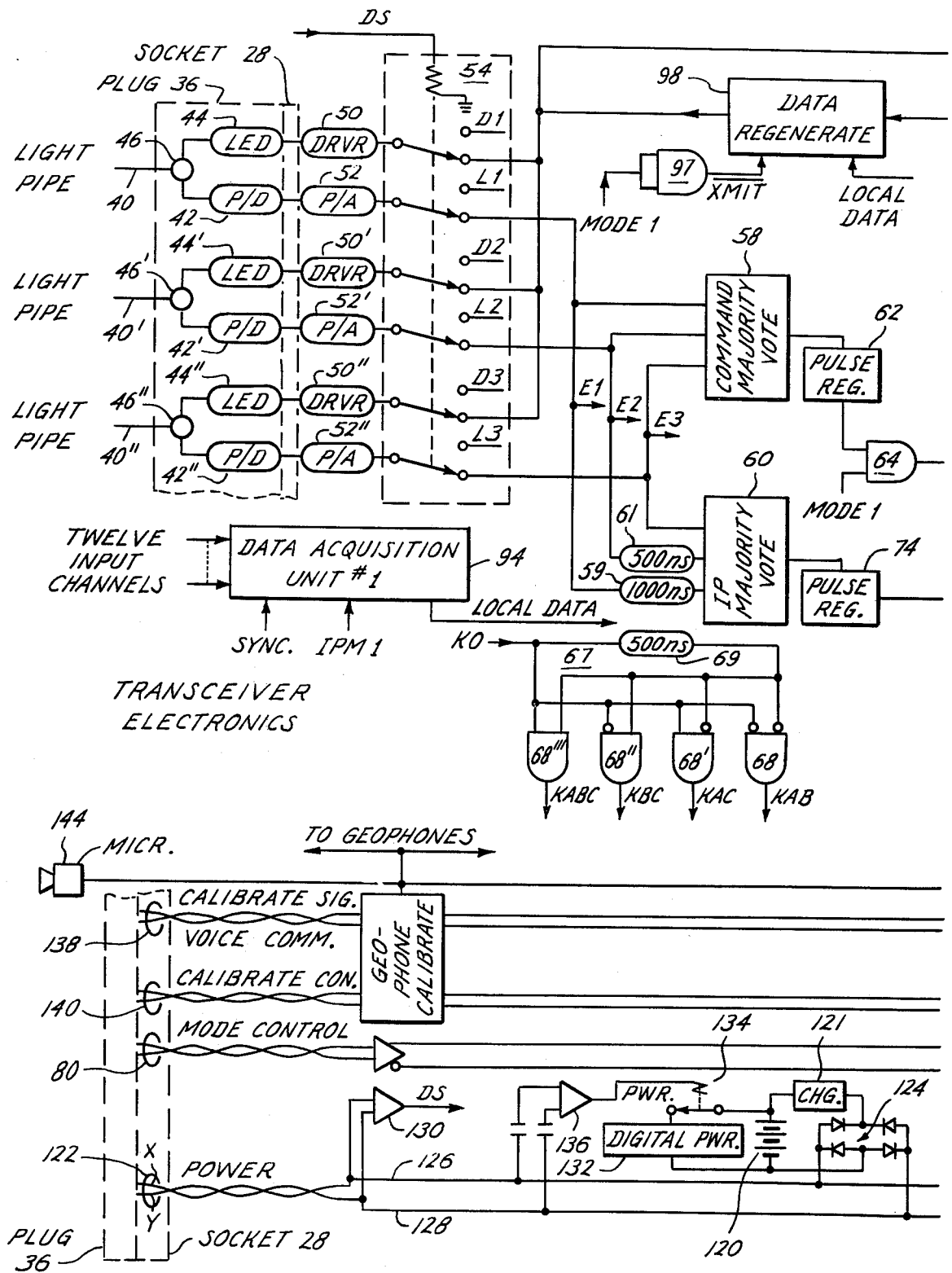
FIGS. 3a and 3b are the right and left halves of a schematic block diagram of the electronic circuitry contained in a data transceiver.

In FIG. 1 there is shown a recording truck 10 containing a recording and control unit 12. Identical data trasceiver modules 20a–20g are laid over the ground 16 along a desired line of survey. The transceiver modules are interconnected with each other and with recording unit 12 by identical cable sections 22a–22e through leading cables 24a and 24b. A plurality of geophones such as 18–18''' are laid along the ground between the transceivers 20a–g and are connected to cables such as 22a–e by "takeouts" or short connectors 38 protruding from the cables 22a–e. Signals from the geophones are processed by electronic circuitry in the transceiver modules and are sequentially transmitted "up-link" or "upstream" (the terms are used interchangeably herein) to recording unit 12 in response to control signals received from the recording unit.

In FIG. 1, four transceiver modules 20a–20d are behind the truck and three, 20e–20g, are in front of the truck. For the transceiver modules behind the truck, the up-link direction of data flow is from left to right. Up-link data flow is from right to left for the transceiver modules in front of the truck. Both transceiver modules 20, and cable sections 22 are unpolarized, symmetrical, and bi-directional. They have no preferred physical orientation with respect to recording truck 10. Accordingly, transceiver modules 20 contain a direction sensing circuit to orient the transceiver modules so that they will electrically "face" the truck and send data up-link regardless of their physical location and orientation with respect to the recording truck. The direction-sensing circuit will be described later.

In the layout illustrated in FIG. 1 the geophones, data transceivers and their interconnecting cable sections, are collectively termed a "spread". Seven transceiver modules with their associated geophones are shown, but in practical operation up to 100 such assemblies are laid along the line of survey. Recording unit 12 in recording truck 10 may be connected into the spread at random at any convenient location. Of the total number of assemblies deployed, a subset including only a fraction of the total number will be activated at a given time while making a seismic recording at a given station.

When the seismic recording operation at the station between transceiver modules 20d and 20e has been completed, the next recording station will be located between modules 20e and 20f. Accordingly, the assembly associated with module 20a, is picked up and repositioned at location 20a' (dotted outlines), to the right in FIG. 1, as the survey progresses from left to right. The truck need not be physically moved but recording unit 12 may be virtually moved electrically or "rolled along" by switching circuitry such as is described in U.S. patent application Ser. No. 665,151, now U.S. Pat. No. 4,023,140, assigned to the assignee of this invention. Of course, in an actual field operation, many, many receiver module assemblies would be laid out well ahead of the recording truck. Recording operations can thus continue uninterruptedly while deactivated transceiver assemblies at the rear of the truck are moved forward ahead of the truck to await reactivation as the survey operation rolls along.

FIG. 2 is an expanded illustration of two data transceiver modules 20a and 20b associated with the interconnecting cable section 22a. A typical transceiver module 20a consists of a case 25, a carrying handle 26, and two female connector sockets 28 and 228 which may be on opposite sides of the case. Case 25 contains seismic data processing electronics, circuits for receiving and identifying command and interrogation pulses, a direction-sensing circuit, pulse regenerators, and a power supply. The electronics network will be explained later. Also mounted on case 25 are a phone jack 32 and an audio/visual alarm 34, for establishing communication between a local attendant and the instrument operator in the recording truck. The data transceiver module weighs but a few pounds and is easily hand-carried.

The modules 20 are interconnected by cable sections such as 22a. Cable section 22a is about 200 feet long and is terminated at each end by indentical male plugs 236, 336 which mate with sockets 228, 338. Either end of cable section 22a may be plugged into either side of transceiver module 20a. The cable section includes three redundant telemetric data channels such as light pipes or coaxial cables. In addition, it contains four twisted wire pairs for power, mode control, geophone calibration and voice communication, and calibrate control, as well as twisted wire pairs to receive geophone signals. The cable diameter is relatively small and, when coiled up, is easily carried by one attendant.

External connections or takeouts 38 provide connections between cable 22a and the geophones 18. Although only four takeouts and geophones are shown on each end of the cable, twelve such takeouts for a like number of geophones are preferred. A single geophone per takeout is illustrated in FIG. 2, but it is commonplace to employ a group of geophones ranging in number from three to as many as 16 geophones per takeout. Separate conductor pairs feed signals from each geophone or geophone group to a corresponding input channel in the transceivers. Thus each geophone or geophone group provides a single channel of data. Transceiver modules 20 accept two sets of 12 geophone groups. Accordingly, a module processes twenty four channels of local data.

The electronics package contained within the data transceiver module consists of the major component blocks listed below. Some of the blocks have already been described in detail in certain related U.S. Patents or patent applications. Pertinent patents and/or applications describing specific blocks are identified below and are incorporated herein by reference:

Pulse and Data Regenerators, FIG. 3 of application Ser. No. 664,617, now U.S. Pat. No. 4,023,140.

Data Acquisition Module, application Ser. Nos. 664,616; 664,617, now U.S. Pat. Nos. 4,031,504 and 4,072,923;

Majority Vote Circuits, FIG. 6 of application Ser. No. 664,618 now U.S. Pat. No. 4,092,629;

Command Select, FIG. 6 of application Ser. No. 665,151, now U.S. Pat. No. 4,023,140;

Geophone Calibrate Control, application Ser. No. 664,618, now U.S. Pat. No. 4,092,629;

Interrogation-pulse Skew-De-skew Circuits;

Direction Sense Circuit;

Power Supply, Mode Control;

Charge Circuit and Standby Control.

In the following description of logic circuits, reference will be made to the two states which are normally found in any such logic circuits. The two states may be considered to represent binary signals and are often referred to as a logic-ONE and logic-ZERO. The logic states represent voltage levels. A predetermined, relatively high voltage such as 2–5V is taken to be a logic-ONE; a lower level such as 0–0.8V is a logic-ZERO. In the case of an AND-gate, if both inputs are raised to the predetermined voltage level, the output similarly changes to become a logic-ONE. The output may also be said to go "high" or "tru3". One or both inputs to an AND-gate may be designed to be inverting. If an input is inverting, a logic-ONE looks like a logic-ZERO and vice versa.

In the case of a D-type flip flop, which is a bi-stable memory unit with a single input (D) and two outputs Q and $\overline{Q}$, the logic level present at the D input is transferred to the Q output when the proper position-going transition from one logic level to another occurs at the CK (Clock) input. The Q output of the flip flop remains in the specified state until a pulse is applied to the Cl(clear) input. The $\overline{Q}$ output always assumes a logic level opposite to the Q output. When reset by a CL pulse, Q goes low or false to a logic-ZERO and $\overline{Q}$ goes high or true to a logic-ONE.

Throughout the specification, signals will be written in capital letters. Thus, MODE 1 is the signal that sets the transceivers in the mode 1 state.

Figure 3B:
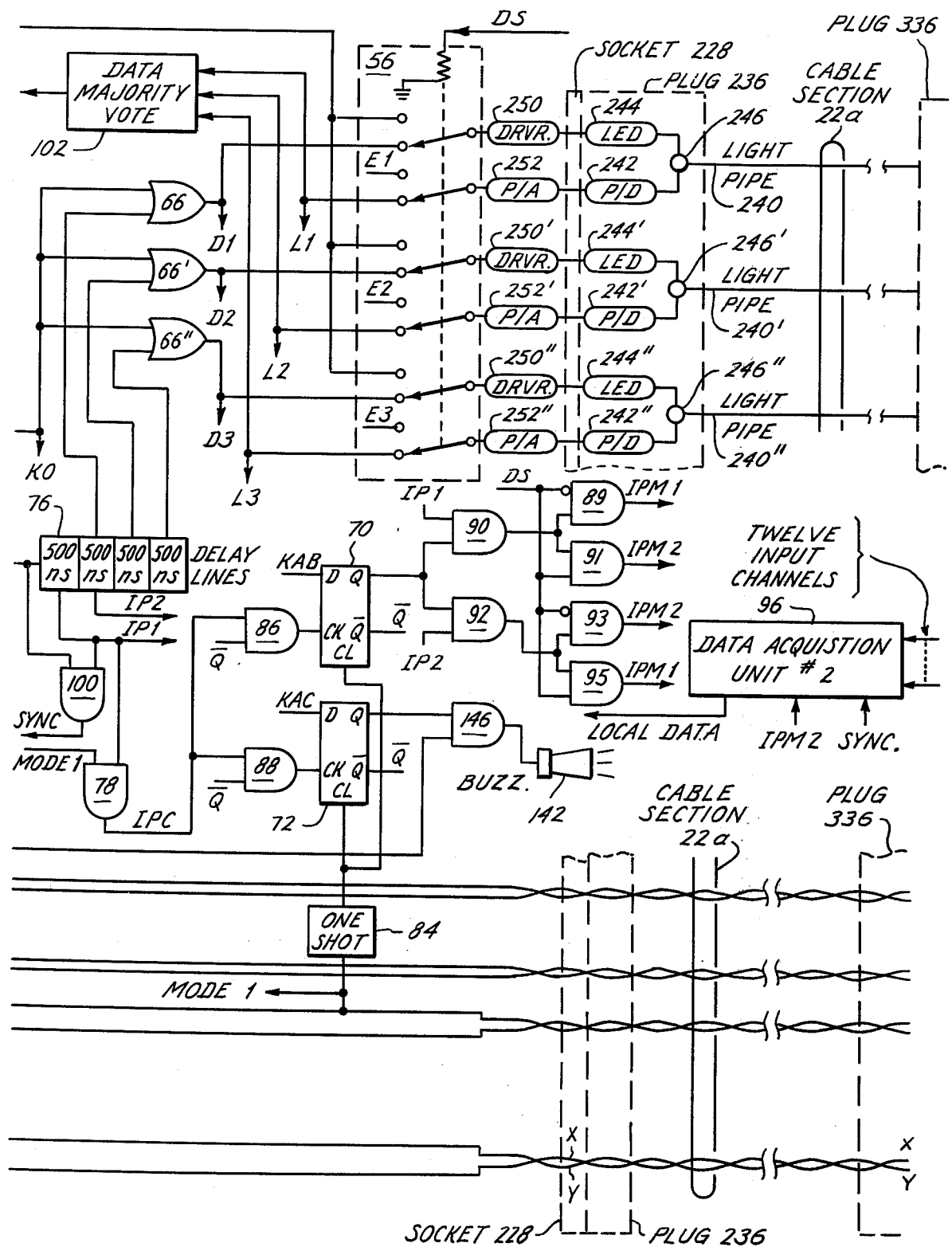

Attention is directed to FIG. 3a and 3b which show, in block diagram form, the electronic circuitry contained within a data transceiver module 20.

As pointed out earlier, the function of a data transceiver module 20, is to transmit local data to the recording unit in response to a control signal. Following transmission of local data, a module 20 receives, regenerates, and retransmits data from down-link transceivers under consideration.

The transceivers operate in two modes: Mode 1, the command or setup mode and mode 0, the transmit mode. Mode selection is made by the mode-control signal, MODE 1, sent from the recording unit to the transceivers over a mode control line. MODE 1 is a square-wave pulse of indefinite length. Its length, that is, the length of time that MODE 1 is true, depends upon the number of switch options that are to be preset. Direction sensing, that is, the determination by a transceiver module of the up-link direction, is accomplished when the transceiver is connected to the spread and the power is turned on, to generate the direction sense signal DS.

In the command mode or mode 1 the transceivers are preset or armed so that after they are later switched to the transmit mode they will perform some desired function. The desired function is enabled by the simultaneous reception of a coded command pulse and an interrogation pulse, at a specified command register. For example, a set of one hundred cable sections and transceivers are interconnected to form a spread with the recording truck connected to one end. It is desired that a subset of only 50 transceivers located in the middle of the spread shall acquire and transmit local data. The 25 transceivers that intervene between the selected subset and the recording unit will remain in a passive state to receive, regenerate and retransmit control pulses and data from the more remote subset of fifty transceivers. Local data acquisition by the non-selected interveing transceivers will be inhibited. The remaining 25 transceivers that lie beyond the selected subset will do nothing. Of course, no data acquisition or data transmission takes place in the command mode.

After the data transceiver modules have been armed in the command mode, they are switched to the transmit mode by setting MODE 1 false (turning off the mode-control pulse). In the transmit mode, an interrogation signal is transmitted to the transceivers. As each of the previously armed transceivers successively receives the interrogation signal, it transmits its local data to the recording unit and stands ready to receive, regenerate, and retransmit local data from the other down-link transceiver modules that have been activated.

With this brief functional introduction, FIGS. 3a and 3b may now be studied in detail.

Data control pulses are transmitted as light pulses between the recording unit 12 and the respective transceiver modules 20, through light pipes 40, 40', 40" and 240–240". Although coaxial cables can be used, light pipes are preferred because, since they have a greater band width, a higher data transmission rate can be achieved. The light pipes may be of any well-known, low-loss type such as the plastic coated optical fibers BNR 7-1-A, supplied by Bell-Northern Research, of Ottowa, Quebec.

Light pipes 40, are used bidirectionally. That is, control signals may be transmitted from the recording unit 12 and data are transmitted to the recording unit 12 through the light pipes in the opposite direction although not at the same time, of course. Three light pipes are used in parallel to provide redundancy in case one of the light pipes breaks. Since the transceivers 20 must both receive and transmit, both ends of each light pipe are terminated with a photo detector 42, such as the silicon P-I-N BNR D-5-1 made by Bell-Northern, and an LED (light emitting diode) 44 such as the GaAlAs injection laser BNR L-5-2 also made by Bell-Northern. A star coupler 46 is provided for bidirectional communication between either photo dietector 42, and light pipe 40, or between LED 44, and the light pipe 40.

FIG. 4 is an illustration of a star coupler. Photo detector 42, LED 44 and light pipe 40 are assembled together in a bundle with their active faces all exposed in the same direction. The active faces are bonded to a spherical mirror 48 which may be of plastic. A light pulse emitted by LED 44 is reflected into the light pipe 40 by mirror 48 as shown by the dashed line. A light pulse emanating from light pipe 40 is reflected by mirror 48 onto the sensitive face of photo detector 42. An LED driver 50 of any commercial type energizes the LED 44; a conventional preamplifier 52 provides electrical output from the photo detector 42. LED 44 and photo detector 42, permanently bonded to the end of light pipe 40, are embedded in the case of the multiconductor plug 36 as outlined by the left hand dashed rectangle in FIG. 3a.

Star couplers are described in a research paper number L-1408 by Frank L. Thiel entitled "A Unique Component for Multimode Optical Waveguide Communications Systems: The Star Coupler." The paper is available from Corning Glass Works of Corning NY.

It would be possible of course, to mount the star couplers 46 inside the case of a transceiver 20. To do so would require optical connections between a socket 28 and a plug 36. In a dirty field environment, such a connection is impractical. Accordingly star coupler 46 is mounted inside the case of plug 36, 236. LED driver 50, 250 and preamplifier 52, 252 are, however mounted inside the case of transceiver module 20. Electrical connections are established via designated contacts in sockets 28, 228 and plugs 36, 236. Since a star coupler 46 occupies only a few cubic millimeters, it will readily fit inside the plug case.

Returning again to FIGS. 3a, 3b assume that the recording unit is to the left of the transceiver represented by the figures. Accordingly, control signals flow from left to right and local data signals flow from right to left. With direction sense switches 54, 56 in the position shown, control signals that is, command pulses (K) or interrogation pulses (IP) are received by photo detectors 42, 42', 42" and are amplified by preamplifiers 52, 52', 52". Leaving the preamplifiers 52, the pulses propagate to majority vote circuits 58, 60. When control signals are present on at least two out of the three lines, the set of pulses is accepted as valid control signal.

A command signal consists of a set of three two-digit pulses whose leading edges are aligned with each other in time. Command majority vote circuits 58 accepts such a set of aligned pulses and generates a corresponding single two-digit output pulse to pulse regenerator 62. The regenerated pulse enables AND-gate 64. With MODE 1 true, the signal KO is applied in parallel to OR-gates 66–66", thereby generating three new command pulses for transmission to the next down-stream transceiver over lines 240–240". The signal KO is also sent to command selector 67, to be later described.

An interrogation pulse set consists of three square wave pulses staggered or skewed in time with respect to each other. Skewing of the IP's is required in order to distinguish them from command pulses K. IP majority vote circuit 60 in conjunction with delay lines 59 and 61 accepts any two out of three pulses as a valid IP. In an interrogation pusle set, the second pulse lags the first pulse by 500 ns. The third pulse trails along 500 ns behind the second pulse. When the skewed pulses arrive at majority vote circuit 60, the leading first pulse is delayed 1000 ns by delay line 59, the second pulse is delayed 500 ns by delay line 61 and the trailing third pulse is delayed not at all. Accordingly all three IP's appear at the inputs of IP majority vote circuit 60 aligned in time with each other.

From the above description, it will be seen that command majority vote circuit 58 will not mistake an interrogation pulse set for a command pulse set because th IP set is skewed. Similarly IP majority vote circuit 6 cannot accept a set of command pulses because th command pulses would be skewed by delay lines 59 an 61.

After a set of interrogation pulses has been de-skewe and accepted as valid by majority vote circuit 60, the are combined into a single pulse at the output of th circuit. The output pulse is regenerated by pulse regen erator 74. The regenerated pulse is transmitted to dela line 76. Here, a new set of three re-skewed interrogatio pulses is generated by the last three 500-nanosecon sections of delay line 76. Thus, after a fixed delay o 1000 ns, a pulse is transmitted to OR-gate 66; 500 n later a secnd pulse appears at OR-gate 66' and the thir pulse of the set is sent to OR-gate 66" after 500 ns delay From OR-gates 66–66", the set of three IP's is transmit ted through lines 240–240" to the next down-link trans ceiver.

In mode 1, it is useful to have the capability for per forming several distinct switching functions. A particu lar desired switching function is enabled by transmittin coded command pulses. A command select circuit 67 i provided, composed of gates 68–68"' and delay line 69 The input to the circuit is the signal KO from AND gate 64. Four outputs KAB, KAC, KBC, and KAB( are available. Of course, the circuit could be modified t include more or fewer command codes, if desired. Eacl command code performs a different function.

A switching function can occur only when a code( command pulse and an IP are simultaneously present a the CK and D inputs of a command register such as 7( or 72. Interrogation signals are delayed by 1000 ns ii each module by the first two sections of delay line 76 Command signals are not delayed. Hence comman( signals propagate down the spread more rapidly than d( the interrogation signals. To perform a desired switch ing action in a specified data transceiver module, ai interrogation-pulse set is first transmitted downstrean by the recording unit. After a specified wait, a com mand-pulse set is transmitted. The faster-traveling com mand pulses intercept the interrogation pulses and be come coincident with IP at the desired transceiver mod ule. The specified waiting time between transmission o an interrogation signal and transmission of the com mand signal is equal to the fixed delay of 1000 ns buil into each transceiver, multiplied by the number of trans ceiver modules intervening between the recording uni and the selected transceiver module. Control of switch ing functions by use of the pulse interception techniqu has been described in detail in U.S. Pat. No. 3,996,55 and U.S. patent application Ser. No. 665,151, now U.S Pat. No. 4,023,140, both assigned to the assignee of thi invention.

Figure 5:
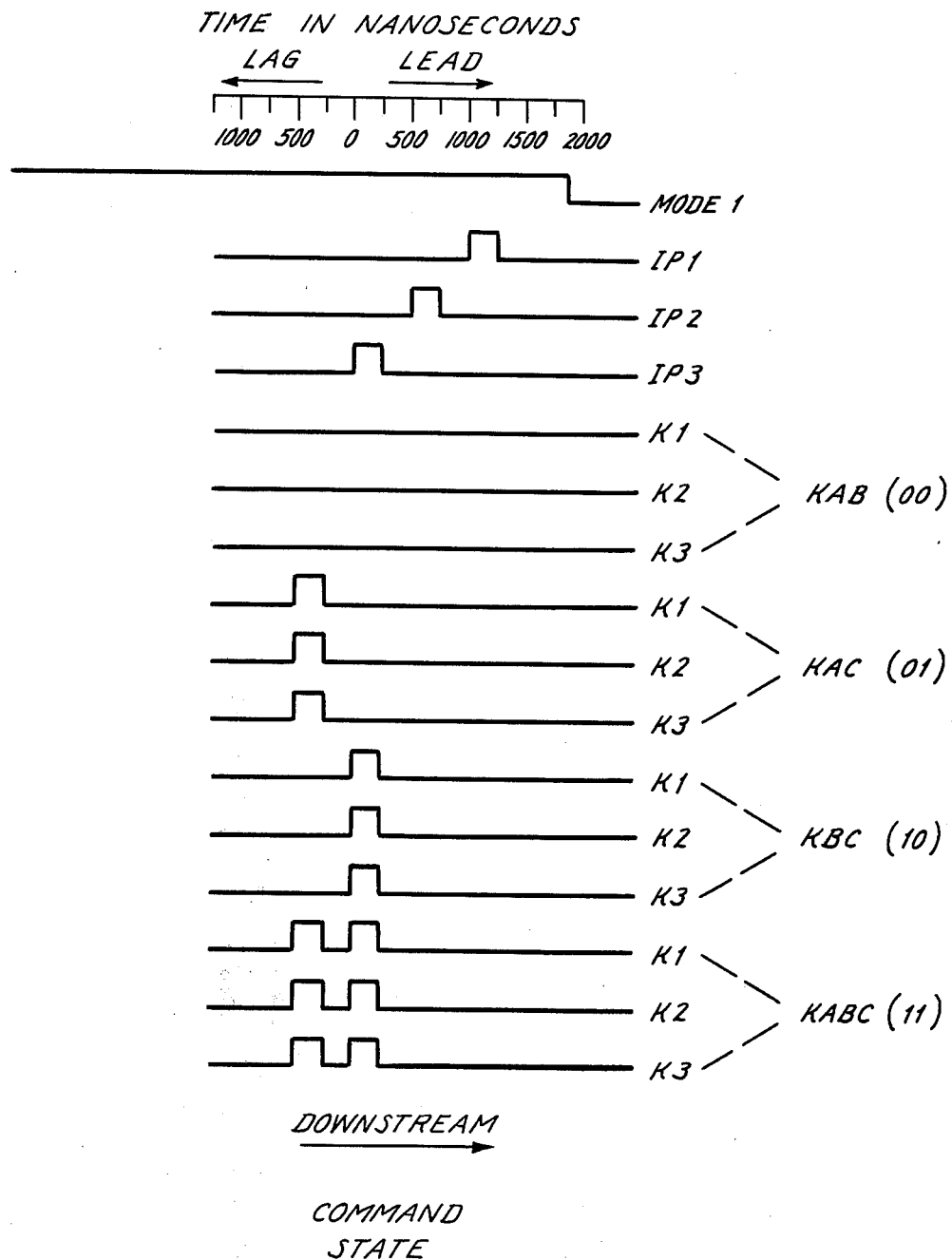
FIG. 5 is a timing diagram of the mode-control, command, and interrogation pulse sequence in the command state.

Refer now to FIG. 5 and to FIGS. 3a, 3b with partic ular reference to command select circuit 67. The signa timing relationships shown in FIG. 5 are such as migh exist at the instant that a transceiver is about to receiv a setup command. The system is set to mode 1 witl MODE 1 true (top trace). A set of skewed interrogatio pulses are shown as traces IP1–3. The leading edges ar separated by a 500 ns skew delay and the width of th pulses is half the skew delay or 250 ns in this exemplar timing diagram. The remaining four sets of three trace each show the pulse coding required to generate the four exemplary command pulses.

So far, in this disclosure, we have referred to a "command pulse" in the singular. In actual use, a set of command signals includes three groups of two binary bits each which may assume the logic states 00, 01, 10, 11. The width of each bit is one half the skew delay or 250 ns, their separation is 500 ns, and the leading edge of the leading command signal bit is aligned in time with the leading edge of the trailing interrogation pulse at the instant of decoding.

KAB is represented by 00. Referring to command select circuit 67 in FIG. 3, zeros at the two inputs to gate 68 generate a logic 1 at the output, since the inputs to the gate are both inverting, KAB in combination with an IP will enable a command register such as flip-flop 70. KAC is 01. In command select circuit 67, gate 68', the right hand input is inverting. Accordingly, when the zero bit transits delay line 69, it enables the inverting input of gate 68'. Since the zero bit is delayed 500 ns in delay line 69, the 1-bit arrives at the non-inverting input at the same time, and sets the output of gate 68' true to generate a KAC pulse that is 250 ns wide. It will be remembered that the first section of delay line 76 imparts a fixed delay of 500 ns to the IP. Accordingly, since the command signal and the IP have been equally delayed, they will be coincident at a second command register such as 72.

KBC is represented as 10. The logic-1 is delayed 500 ns in delay line 69 and becomes the input to the non-inverting input to gate 68". Five hundred nanoseconds later, the zero bit sets the inverting input true to provide a logic-1 at the output as the signal KBC. As before, the 500 ns delay is delay line 69 just compensated for the fixed IP delay.

KABC is the binary number 11. The first digit is delayed 500 ns by delay line 69 and sets the right hand input of gate 68" true. At the same time the second digit catches up to the first digit to set the other input true. With both inputs true, the output is a logic 1 which is the signal KABC.

The mode is selected by transmitting a pulse of indefinite length over mode select line 80. Referring to FIGS. 3a, 3b when one side 82, of mode select line 80 goes to logic-ONE, the leading edge of MODE 1 causes one-shot 84 to generate a clear pulse to command registers 70, 72, setting Q low and $\overline{Q}$ high. So long as MODE 1 is true, it enables AND-gates 64 and 78. It also enables AND-gate 97 to generate the signal $\overline{XMIT}$.

As stated earlier, since the cables and the data transceivers are unpolarized and bidirectional, a means must be provided to establish the up-link direction of signal propagation independintly of the physical location of the transceivers with respect to the recording unit. The direction sense circuit is a part of the power supply charging circuit. The data transceivers are powered by a 12 V rechargeable battery 120. Battery 120 is continuously under trickle-charge by charger 121 from a voltage applied to power line 122, through a full wave rectifier 124 floating across the line. The two legs, 126, 128 of powerline 122 are respectively connected to selected pins of the left hand connector socket 28, such as contacts or pins X and Y (refer to FIG. 7). The two legs are transposed between the left and right hand connector sockets 28, and 228 so that pin X on the left hand socket 28 is wired to pin Y of the right hand socket 28. A polarity comparator 130 is connected across lines 126 and 128. If line 126 is positive, the output of comparator 130 is low, otherwise DS goes high. The output DS, of comparator 130 goes to six-pole double throw direction sense relays 54, 56, which can be well known solid state switches. In FIGS. 3a, 3b it is to be understood that relay terminals $D_1 - D_3$, $E_1 - E_3$ and $L_1 - L_3$ are hard wired to the corresponding arrowed lines on the opposite side of the diagram.

Assuming that line 126 is positive when the recording unit is to the left of a transceiver module and that the module physically faces as shown, DS is low and the switches assume the position illustrated. If the transceiver module is flopped over so that direction sense relay 56 is to the left of the drawing, pin X of the socket 28 will be positive but line 128 rather than 126 will be positive because of the transposition of wires between the opposite sockets 28 and 228. Accordingly, the output of comparator 130, DS, will go high or true, causing direction sense relays 54 and 56 to switch to the upper contact positions. Scrutiny of the diagram will show that the propagation direction of control pulses is again left to right and data flow is right to left. Now relocate the recording unit to the right of FIG. 3a and again make terminal X on the right hand socket 28 positive. With X positive on the right, line 128 will also be positive, setting the output DS, of comparator 130 high. Relays 54, 56 are actuated to move switch contacts to the upper terminals. Close examination of the diagram will demonstrate that control signal flow is right to left and the data flow, up-link, is now left to right. The direction sense operation takes place as soon as a transceiver is connected to power. It should be understood that the power lines connecting the pins in the opposite plugs 36 and 236 of each cable section 22 are also transposed (FIG. 7). Relays 54 and 56 are shown as mechanical relays. In actual practice, they would be electronic switches.

In operation in mode 1, the system functions as follows: MODE 1, true, is transmitted, resetting flip-flops 70, 72 and enabling gates 64 and 79. DS, the direction sense signal is assumed to be false so that the switch positions of direction sense relays 54, 56 are as illustrated. A skewed set of interrogation pulses is received by the transceiver; the pulses are de-skewed and majority-voted upon. The de-skewed IP passes through pulse regenerator 74 and into the first section of delay line 76. Five hundred nanoseconds later, it emerges from the delay line as IP1. Since AND-gate 78 is enabled by MODE 1, IPC, the output of the gate goes true. Upon the arrival of the last IP, a set of command signals are received by majority-vote logic 58 and by command select logic 67. Assume that KAB (FIG. 5) has been transmitted. With gate 64 enabled by MODE 1, KO is generated at its output. KO enables command select logic 67 to send a KAB signal to the D input of flip flop 70. It should be noted that the first 500 ns IP delay in delay line 76 just compensates for the 500 ns delay of the command-pulse set through delay line 69. Thus, the command pulse intercepts the interrogation pulse at flip-flop 70. When flip-flops 70 and 72 were reset by MODE 1, the Q output became false and $\overline{Q}$, true. With $\overline{Q}$ true, gates 86 and 88 are enabled. Accordingly KAB true at the D input of flip-flop 70, is clocked to the Q output by IPC. Q goes true and $\overline{Q}$ false, disabling AND-gate 86. The Q output of flip-flop 70 enables gates 90 and 92, thereby enabling passage of IP1 and IP2 for generation of IPM pulses when the system is switched to mode 0. Since DS is false, it enables the inverting input of AND-gate 89 and disables gate 91, thereby to allow generation of IPM1 when the system is in the data transmit mode.

MODE 1 true inhibits data transmission and data regeneration by generating $\overline{\text{XMIT}}$ at gate 97.

Second, third and fourth interrogation-pulse sets in combination with a different command pulse combinations such as KAC etc., might be used to set flip-flop 72 to enable other gates as 146, to perform some function such as activating a buzzer 142.

In the above operation, if the transceiver unit represented by FIGS. 3a, 3b were flopped over, DS would go true. With DS true, the noninverting inputs of gates 91 and 95 would become enabled. Accordingly IP1 would generate IPM2 and IP2 would provide the IPM1 pulse.

Flip-flops 70, 72 will remain in the state set in mode 1 after MODE 1 is turned off, and the system is set to the data transmit mode, mode 0. The flip-flops will be reset only when a new MODE 1 is received. It is to be understood that data transmission is inhibited when MODE 1 is true.

A data transceiver module includes two data acquisition units 94, 96. Each data acquisition unit receives analog seismic data from twelve input channels. A data acquisition unit includes a multiplexer having twelve inputs and a common output. Within one scan cycle, the multiplexers, in cooperation with a sample and hold circuit, sequentally sample all twelve input channels. A complete scan cycle might require a time of one milliscend (thousandth of a second). The signal sample from each channel is filtered, gain conditioned, and digitized. The digitized samples are sent over the local data lines to data regenerator 98 for transmission to recording unit 12 over light pipes 40. The details of the circuit elements contained in data acqusition unit 94, 96 and data regenerator 98 are described in detail in U.S. patent application Ser. No. 664,617, now U.S. Pat. No. 4,072,923, assigned to the assignee of this invention.

In the data transmit mode, the interrogation pulses may exist in either of two states. The state is determined by the pulse width. In the first state, the width of the interrogation pulses is one-half the skew delay (FIG. 5). In the second state the interrogation pulse must be longer than the fixed delay due to the first section of delay line 76 but less than 1.5 times the skew delay. Refer to FIG. 6. Since MODE 1 (lower trace is false, the system is in the data transmit state mode 1. The widths of pulses IP1-3 are shown as 625 ns which is greater than the 500 ns fixed delay of the first section of delay line 76 but less than 1.5 times the skew delay (750 ns). An interrogation pulse set in the second state is used to generate a SYNC pulse as described below.

In response to a SYNC pulse that is generated by a set of IP's in the second state, the multiplexers in data acquisition units 94 and 96 are reset to channel zero, a dummy channel. First, one multiplexer is advanced through a scan cycle to sample the respective 12 input channels by transmitting a series of 12 interrogation-pulse sets in the first state and then the other multiplexer is similarly advanced. In response to each IP receiver, the data acquisition units transmit the last-digitized channel local data, digitized the present channel, then advances to the next channel. The delay line interval is sufficient time to allow transmission of one channel of local data before data words from down-link data transceivers arrive for retransmission up-link.

In transmit mode the system operates as follows: MODE 1 is turned off. A set of skewed, wide interrogation pulses in the second state (a sync group) is transmitted from the recording unit to the transceivers. Upon receipt by a transceiver, the pulse set is de-skewed and IP enters the first section of delay line 76. The leading edge of IP enables AND-gate 100. When the leading edge of IP exits the first section of delay line 76, 500 ns later, IP1 is generated. Since IP is 625 ns wide, IP is high at both inputs to gate 100, generating SYNC as well as IP1. IP1 also generates an IPM1 as above described. SYNC and IPM1 together reset the multiplexer and request local data transmission from the last-digitized channel of data acquisition unit #1. SYNC also resets the multiplexer in data acquisition unit #2 but local data transmission is not enabled until IP2 is generated 500 ns after IP1. Generation of IP2 sets IPM2 to request local data from data acquisition unit #2. As described above, the sync pulse group is reskewed and transmitted down-link to the next transceiver.

Following transmission of the state-two interrogation pulse set, a series of up to 23 state-one interrogation pulse sets (tranmit groups) are subsequently transmitted to enable data transmission from the remaining channels. In state one, the width of IP is only 250 ns. Accordingly, gate 100 does not generate a SYNC pulse, although it does generate the signals IPM1 and IPM2. Of course, local data can be transmitted from any lesser number of input channels by transmitting a new state-2 sync group before the complete series of state-1 transmit-group pulses have been sent.

In the above operational sequence, after a transceiver module has transmitted its local data for the first channels in data acquisition units #1 and #2, it reverts to a passive state until the next interrogation pulse set arrives. In the passive state, the transceiver module receives data words from down-link modules at data majority vote circuit 102. Valid data pulses are regenerated by data regenerator 98 and are retransmitted up-link to recorder unit 12.

If the data transceiver module is reversed from the direction shown in FIGS. 3a, 3b the operating sequence of data acquisition units #1 and #2 must be reversed. When the direction sense signal DS is low or logic-ZERO, IP1 which enables data acquisition unit #1. When the transceiver is reversed, DS goes high to a logic-ONE and IP1 generates IPM2, thereby enabling data acquisition unit #2 first.

The electronic switches formed by AND-gates 89, 91, 93, 95 performs the reversing function. A similar set of switches could be substituted for the relays 54 and 56.

In this disclosure, the system description has been confined to presetting a desired control function into a single data transceiver. In an actual oper ation, the entire spread of data transceivers is set to mode 1. Any selected number of the transceivers can be preset to perform a given function by sending an interrogation-pulse set down-link to al of the transceivers. Subsequently several separate sets of command pulses are transmitted. The individual sets of command pulses are delayed by different integral multiples of the known time increment to enable them to intercept the interrogation-pulse set at several designated data transceivers. Thus, assume that 10 out of 50 data transceivers are to be preset to transmit data when switched to mode 0, and that transecivers 23 through 33 are to be selected. All of the transceivers are set to mode 1 and an interrogation-pulse set is transmitted. A fixed delay of 1 microsecond (1000 ns) is attributable to each transceiver. Accordingly 22 microseconds after the interrogation pulse set was transmitted, a first set of command pulses is sent down-link. The above delay accounts for the 22 transceivers intervening between the recording unit 12 and the first designated transceiver unit, #23. A second set of command pulses is transmitted 23 microseconds later to preset transceiver #24 etc. The last set of command pulses is transmitted after a 32 microsecond delay to preset the last transceiver #33.

Power for the digital electronics in the transceiver is furnished by a DC/DC converter 132 connected across the battery. A relay-actuated switch 134 disconnects the power when the system is in standby. In operation, a high-pitched AC signal (1000 KC) is sent down the power line and actuates receiver 136 which is AC-coupled across the power line 122. Upon receipt of the signal, receiver 136 generates a signal PWR which closes relay 134 to connect battery power. In standby, the signal is removed from the line, allowing relay 134 to open, disconnecting the battery.

Geophone calibration signals and a calibrate control signal are transmitted over lines 138 and 140 respectively Operation of the geophone calibrate circuits is described in U.S. patent application Ser. No. 664,618, now U.S. Pat. No. 4,092,629. It should be understood that the same lines can be used to transmit an alert signal for a buzzer and to establish voice communications via microphone 144. Buzzer 142 is energized as follows. In a mode 1 state, an interrogation pulse set is transmitted to the transceiver, followed by a KAC command pulse set. When the command pulse intercepts the interrogation pulse the desired transceiver, flip-flop 72 is set and AND-gate 146 is enabled. A signal may be sent down the calibrate signal line to set off the buzzer through now-enabled AND-gate 146. The buzzer is shut off by sending a new MODE 1 signal to reset flip-flop 72.

In closing it should be understood that variations of the disclosed circuit are within the scope of the present invention. By way of example but not by way of limitation, the up-link direction from a transceiver to the recording truck may be determined by circuitry that senses which of the two transceiver connecting plugs actually receives an incoming interrogation or command signal instead of employing the polarity of the DC power on a specified connecting wire. Accordingly, the scope of this case is only to be limited by the appended claims.

I claim as my invention:

1. In a seismic exploration system a means for enabling a desired switching sequence in, and data-signal transmission from, a plurality of substantially identical transceiver modules each having several input channels and an output channel, disposed over the ground in consecutive order defining a spread, at least one seismic sensor being connected to each of the several input channels, the system comprising:

a recording and control unit;

a wide band transmission link for interconnecting said data transceiver modules in series with each other and with said recording and control unit, said transmission link and said data transceivers being unpolarized so that there is no preferred electrical or physical orientation of said transmission link with respect to said data transceiver modules and to said recording and control unit, said transmission link further including a bidirectional, common signal channel for transmitting both control and data signals independently of each other and in opposite directions between said data transceiver modules and said recording and control unit;

a DC power supply in each said transceiver module;

a conductor pair in said transmission link for transmitting a DC voltage to said power supply; and means in each said transceiver for sensing the polarity of the DC voltage on a selected conductor of said conductor pair to define the required direction to signal propagation between said transceivers and said recording and control unit.

2. The system as defined by claim 1 wherein said common signal channel consists of at least three redundant signal transmission lines, the system further including:

means for applying a first unique signal comprising a set of square wave pulses skewed in time with respect to each other, to the respective redundant signal transmission lines and means in each said transceiver module for receiving and deskewing said pulses to provide an interrogation pulse;

means for applying a delayed second unique signal defined by a coded set of aligned-in-time pulses to said three redundant transmission lines, the code being defined by a two-bit binary number;

detector means in each said transceiver for sensing the simultaneous presence of said second unique signal and said interrogation pulse as a first function-control signal; and means for applying said first unique signal a second time and for applying a delayed third unique signal defined by a set of aligned-in-time pulses having a two-bit binary number code different from said second unique signal, said detector means sensing the simultaneous presence of said first and third unique signals as a second function-control signal.

3. In a seismic exploration system for recording seismic signals from a subset of data transceivers selected from a plurality of substantially identical such transceivers disposed over the ground in consecutive order defining a spread, said subset including at least one transceiver, each said transceiver including: two identical first connectors, at least one data acquisition unit having a plurality of seismic signal input channels, means for digitizing analog signals from each said input channel and means for multiplexing said digitized analog signals to a common output channel, each said transceiver having two operating modes, a setup mode and a transmit mode, the improvement comprising:

a recording unit stationed at an arbitrarily selected location along said spread for transmitting interrogation and command signals to, and for receiving data signals from said subset of data transceiver modules, said interrogation signals having first and second stages;

a signal transmission link comprising a plurality of wide band signal transmission cables for detachably interconnecting said data transceiver modules with each other in series and with said recording unit, each said transmission cable including a common, triple redundant signal transmission channel, each said cable being terminated at both ends by identical second connectors having a plurality of contacts, either one of said second cable connectors being matable with either one of said first connectors in said transceivers, said common transmission channel being bidirectional so that command, interrogation, and data signals may be separately transmitted in opposite directions between the recording unit and the transceivers over said common transmission channel; and means in said recording unit for transmitting a mode-select signal to switch said subset of transceivers to a desired operating mode.

4. The system as defined by claim 3 wherein:

each said first connector plug has a plurality of coded contacts including X and Y contacts, and a pair of conductors interconnecting the X and Y contacts of said two first connectors in said transceivers in transposed relationship;

a power supply means in each said transceiver connected across said X and Y coded conductor pair;

two-conductor power line means contained within each said signal transmission cable for delivering DC electrical power from said recording unit to said power supply means, the two conductors of said power line being connected to the X and Y contacts of said second connectors on opposite ends of each said signal transmission cable in transposed relationship;

means for sensing the polarity of the DC potential applied to the X contact of a selected one of said first connectors to define the up-link direction of data flow through said signal transmission link.

5. The seismic system as defined by claim 3 including:

means for transmitting from said recording unit an interrogation signal comprising a set of three square wave pulses skewed in time with respect to each other by a preselected skew delay thorough said three redundant transmission channels, means in each said transceiver for receiving and deskewing said skewed interrogation-pulse set to provide an interrogation pulse, means for regenerating and reskewing said interrogation pulse to provide a new set of skewed pulses, means for retarding the new set of skewed pulses by a known time increment, and means for transmitting said new set of pulses down-link to the next data transceiver in line.

6. The system as defined by claim 5 including:

means for establishing the state of the interrogation signal, the state being defined by the width of said square wave pulses so that in the first state the pulse width is one half the skew delay and in the second state the pulse width is greater than the skew delay and less than the known time increment.

7. The system as defined by claim 6 including:

means in said recording unit for transmitting a coded command signal comprising a set of time- aligned signals transmitted over the three redundant transmission channels, the command code being defined by a two-bit binary number, the bit width being one-half the interrogation pulse skew delay.

8. The system defined by claim 7 including:

means in said data transceivers for receiving and decoding said command pulses and means for regenerating and retransmitting said pulses down-link to the next data transceiver in line.

9. In a seismic exploration system for recording seismic signals from a plurality of identical unpolarized data transceivers disposed over the ground in consecutive order defining a spread, each said transceiver including: two identical first connectors having at least two power contacts, at least one data acquisition unit having a plurality of analog seismic signal input channels, means for digitizing the analog signals from each said input channel and means for multiplexing said digitized analog signals to a common output channel, the system further including a recording unit stationed at an arbitrarily selected location along said spread, a plurality of bidirectional, unpolarized, wideband signal transmission cables for detachably interconnecting said data transceivers in series with each other and with said recording unit, the transmission cables being terminated at each end by identical second connectors mateable with said first connectors, the improvement comprising:

a power supply means in each said data transceiver unit;

a two-wire power line means in each said transmission cable for delivering a DC charging voltage to said power supply means, said two wires being transposed between corresponding contacts in said second connectors terminating said transmission cable, the voltage in said two wires being of opposite electrical polarity;

means for interconnecting the power contacts in the two corresponding first connectors of each said transceiver in transposed relationship; and direction sensing means in each said transceiver for defining the uplink direction of said bidirectional transmission cables by sensing the electrical polarity of a one of said power contacts in a one of said two first connectors.

10. In a seismic exploration system, the method of signaling a member of a subset of multichannel unpolarized seismic data transceivers selected from among a plurality of substantially identical such receivers disposed at consecutive spaced-apart intervals as a spread along a line of survey over the surface of the earth, said transceivers having two operating modes, a setup mode and a data-transmit mode, comprising the steps of:

positioning a recording unit at a randomly-selected location along the spread;

interconnecting the recording unit with the plurality of data transceivers by a link plurality of bidirectional, unpolarized transmission cables having three parallel signal transmission channels;

switching said transceiver subset member to the setup mode;

transmitting bi-state interrogation signal, comprised of a set of three pulses skewed in time, relative to each other, downstream from the recording unit to said transceiver subset member through the respective three signal transmission channels;

retarding propagation of said interrogation signal by a known time increment at each data transceiver that intervenes between said subset member and said recording unit;

transmitting a first coded command signal to said subset member;

delaying transmission of said first coded command signal by an integral multiple of said known time increment, said integral multiple being equal to the number of data transceivers intervening between said recording unit and said transceiver subset member; and sensing the substantially simultaneous presence of said interrogation and first command signal at said subset member as a signal for presetting a first control function in said member.

11. The method defined by claim 10 including the steps of:

transmitting a second interrogation signal and a differently coded, second delayed command signal to said selected member of said transceiver subset;

sensing the substantially simultaneous presence of said second interrogation and command signals at said subset member as a signal for presetting a second control function in said member.

12. The method as defined by claim 11 including the steps of:

switching said transceivers to a data transmit mode;

transmitting an interrogation signal in a second state to said selected subset member for resetting said member;

transmitting a sequence of interrogation signals in a first state to said selected member for enabling data transmission from the respective input channels of said selected transceiver subset member, the signal state being defined by the width of said skewed pulses, the widths being one half the skew delay in the first state, and in the second state, the pulse width is greater than the skew delay and less than the length of the known time increment.

13. In a seismic exploration system including a plurality of identical multichannel data transceivers for receiving, processing and transmitting seismic data signals, each said data transceiver having a function-control circuit for controlling the signal-reception, processing and transmission-sequence, a recorder for sending control signals to and receiving processed seismic signals from said transceivers, a plurality of cables that interconnect said data transceivers with each other in series and with said recorder, said cables including redundant parallel lines for transmitting control and seismic data signals in a required direction, the improvement comprising:

means in said recorder for sending a control signal of a first kind to said transceivers through the respective redundant parallel lines, the first kind of control signal being comprised of a set of discrete pulses, skewed in time with respect to each other;

means in the function-control circuit for receiving and deskewing the first kind of control signal to provide an interrogation signal;

means in said recorder for sending to said transceivers through said redundant parallel lines a control signal of a second kind, the second kind of signal being comprised of a set of discrete aligned-in-time pulses, that are identifiable by a first two-bit binary code, there being a selected delay between transmissions of said first and second pulse sets; and means in said function control circuits for sensing the substantially simultaneous presence of the interrogation signal and the second kind of signal as a first function-control signal.

14. The system as defined in claim 13 including:

means in said recorder for sending a control signal of the first kind through the redundant parallel lines, to provide a second interogation signal, a second time, followed, after a selected delay, by a second control signal of the second kind that is identifiable by a different two-bit binary code; and means in said function control circuits for sensing the simultaneous presence of the second interrogation signal and the second, differently encoded signal of the second kind as a second function-control signal.

15. The system as defined in claim 14 including:

means in each said transceiver for transmitting processed seismic data signals to said recorder in response to at least one of the function-control signals.

16. The system as defined in claim 15 including:

a DC power supply in each said transceiver;

two conductors in each cable for delivering DC power from said recorder to the power supplies; and means in each said transceiver for establishing the upstream direction between the transceivers and the recorder by detecting the electrical polarity of a selected one of said two conductors.

* * * * *